C. A. WEED.
APPARATUS FOR RAISING AND LOWERING THE REELS OF GRAIN-HEADERS.

No. 191,497. Patented May 29, 1877.

UNITED STATES PATENT OFFICE.

CLINTON A. WEED, OF RACINE, WISCONSIN.

IMPROVEMENT IN APPARATUS FOR RAISING AND LOWERING THE REELS OF GRAIN-HEADERS.

Specification forming part of Letters Patent No. 191,497, dated May 29, 1877; application filed March 19, 1877.

*To all whom it may concern:*

Be it known that I, CLINTON A. WEED, of Racine, in the county of Racine, in the State of Wisconsin, have invented certain Improvements in Apparatus for Raising or Lowering the Reel in Grain-Headers, of which the following is a specification:

The object of my invention is to raise or lower the reel of a grain-header; and consists in an arrangement of rollers, a jointed arm, a wheel, and lever.

The accompanying drawings form part of this specification.

Figure 1:
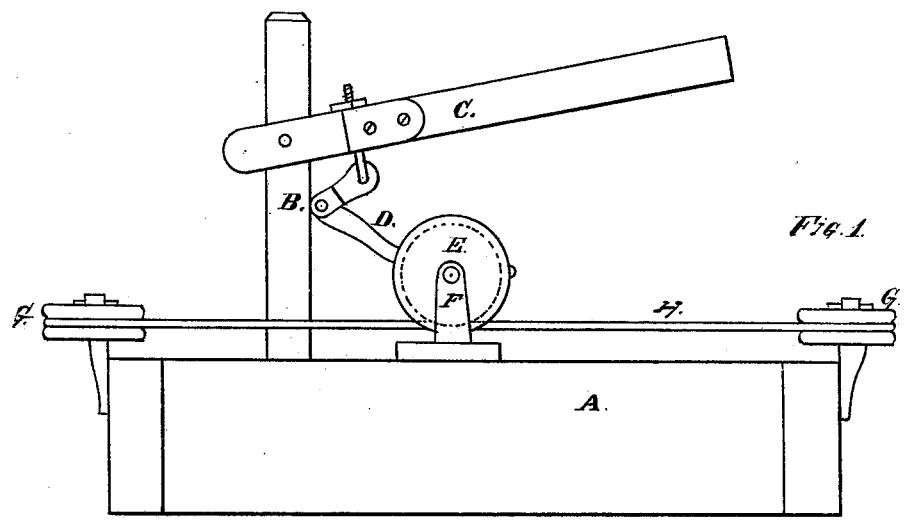
Figure 2:
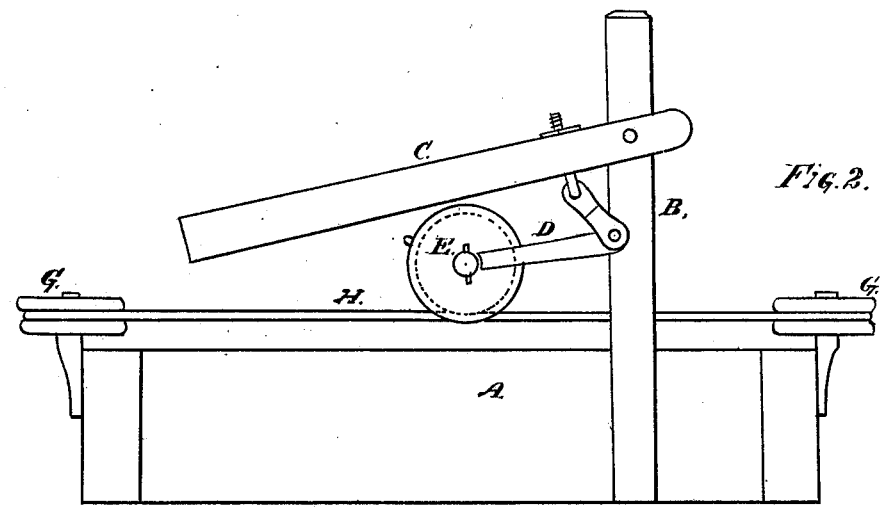

Figure 1 is a side view of my invention, and Fig. 2 a view of the other side of the same.

In the drawings, A represents the frame; B, a standard on said frame; C, a reel-lever, one end of which is pivoted to the standard B; D, a jointed arm attached to the lever C at one end; E, a sheave to which the other end of the jointed arm is attached; F, a standard on the frame A, to which sheave E is hung; G G, sheaves around which rope H runs; H, a rope which passes around sheave E. As rope H is pulled in one direction, it being fastened at one point of the periphery of sheave E, sheave E will be turned about its axis, and thereby raise or lower lever C. A corresponding apparatus is attached to the other side of the header, and the reel-axis is hung upon the levers so that as the levers are raised the reel will be raised, and as the levers are depressed the reel will be lowered.

What I claim as new, and desire to secure by Letters Patent, is—

Lever C, arm D, and sheave E, in combination with rope H, substantially as and for the purpose specified.

CLINTON A. WEED.

Witnesses:
   A. BATES,
   H. C. AKERS.